US008649554B2

(12) United States Patent
Markovic et al.

(10) Patent No.: US 8,649,554 B2
(45) Date of Patent: Feb. 11, 2014

(54) METHOD TO CONTROL PERSPECTIVE FOR A CAMERA-CONTROLLED COMPUTER

(75) Inventors: Relia Markovic, Seattle, WA (US); Gregory N. Snook, Sammamish, WA (US); Stephen Latta, Seattle, WA (US); Kevin Geisner, Seattle, WA (US); Johnny Lee, Bellevue, WA (US); Adam Jethro Lanygridge, Surrey (GB)

(73) Assignee: Microsoft Corporation, Redmond, WA (US)

( * ) Notice: Subject to any disclaimer, the term of this patent is extended or adjusted under 35 U.S.C. 154(b) by 1030 days.

(21) Appl. No.: 12/475,245

(22) Filed: May 29, 2009

(65) Prior Publication Data

US 2010/0281439 A1 Nov. 4, 2010

Related U.S. Application Data

(60) Provisional application No. 61/174,898, filed on May 1, 2009.

(51) Int. Cl.
*G06K 9/00* (2006.01)

(52) U.S. Cl.
USPC .......................................... 382/103; 382/107

(58) Field of Classification Search
USPC ......... 382/100, 103, 104, 209, 218, 107, 168, 382/170, 180, 190, 224; 345/156, 173–474, 345/419; 715/863; 704/243; 348/77, 348/E7.085, 40, 169; 375/240.28; 434/258; 463/8, 30–31, 33, 36, 258; 473/269, 473/447; 700/138

See application file for complete search history.

(56) References Cited

U.S. PATENT DOCUMENTS

| | | | |
|---|---|---|---|
| 4,627,620 A | 12/1986 | Yang | |
| 4,630,910 A | 12/1986 | Ross et al. | |
| 4,645,458 A | 2/1987 | Williams | |
| 4,695,953 A | 9/1987 | Blair et al. | |
| 4,702,475 A | 10/1987 | Elstein et al. | |
| 4,711,543 A | 12/1987 | Blair et al. | |
| 4,751,642 A | 6/1988 | Silva et al. | |
| 4,796,997 A | 1/1989 | Svetkoff et al. | |
| 4,809,065 A | 2/1989 | Harris et al. | |

(Continued)

FOREIGN PATENT DOCUMENTS

| | | |
|---|---|---|
| CN | 101254344 B | 6/2010 |
| EP | 0583061 A2 | 2/1994 |

(Continued)

OTHER PUBLICATIONS

Qian et al., "A Gesture-Driven Multimodal Interactive Dance System", IEEE International Conference on Multimedia and Expo, Taipei, Jun. 2004, 3, 1579-1582.

(Continued)

*Primary Examiner* — Hadi Akhavannik
*Assistant Examiner* — Mehdi Rashidian
(74) *Attorney, Agent, or Firm* — Judy Yee; Micky Minhas

(57) ABSTRACT

Systems, methods and computer readable media are disclosed for controlling perspective of a camera-controlled computer. A capture device captures user gestures and sends corresponding data to a recognizer engine. The recognizer engine analyzes the data with a plurality of filters, each filter corresponding to a gesture. Based on the output of those filters, a perspective control is determined, and a display device displays a new perspective corresponding to the perspective control.

19 Claims, 13 Drawing Sheets

(56) References Cited

U.S. PATENT DOCUMENTS

| | | |
|---|---|---|
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,057,909 A | 5/2000 | Yahav et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,517 A | 8/2000 | Yahav et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,241,609 B1 | 6/2001 | Rutgers |
| 6,256,033 B1 * | 7/2001 | Nguyen ................ 715/863 |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,325,717 B1 | 12/2001 | Kawagoe |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,498,628 B2 | 12/2002 | Iwamura |
| 6,502,515 B2 | 1/2003 | Burckhardt et al. |
| 6,503,195 B1 | 1/2003 | Keller et al. |
| 6,512,838 B1 | 1/2003 | Rafii et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,674,877 B1 | 1/2004 | Jojic et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,771,277 B2 | 8/2004 | Ohba |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,933,966 B2 | 8/2005 | Taylor |
| 6,937,742 B2 | 8/2005 | Roberts et al. |
| 6,950,534 B2 | 9/2005 | Cohen et al. |
| 7,003,134 B1 | 2/2006 | Covell et al. |
| 7,006,236 B2 | 2/2006 | Tomasi et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,177 B2 | 5/2006 | Tomasi et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,151,530 B2 | 12/2006 | Roeber et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,224,384 B1 | 5/2007 | Iddan et al. |
| 7,227,526 B2 | 6/2007 | Hildreth et al. |
| 7,259,747 B2 | 8/2007 | Bell |
| 7,277,118 B2 | 10/2007 | Foote |
| 7,293,356 B2 | 11/2007 | Sohn et al. |
| 7,308,112 B2 | 12/2007 | Fujimura et al. |
| 7,310,431 B2 | 12/2007 | Gokturk et al. |
| 7,317,836 B2 | 1/2008 | Fujimura et al. |
| 7,340,077 B2 | 3/2008 | Gokturk et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |

(56) References Cited

U.S. PATENT DOCUMENTS

| | | |
|---|---|---|
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |
| 7,746,345 B2 | 6/2010 | Hunter |
| 7,760,182 B2 | 7/2010 | Ahmad et al. |
| 7,809,167 B2 | 10/2010 | Bell |
| 7,834,846 B1 | 11/2010 | Bell |
| 7,852,262 B2 | 12/2010 | Namineni et al. |
| RE42,256 E | 3/2011 | Edwards |
| 7,898,522 B2 | 3/2011 | Hildreth et al. |
| 8,035,612 B2 | 10/2011 | Bell et al. |
| 8,035,614 B2 | 10/2011 | Bell et al. |
| 8,035,624 B2 | 10/2011 | Bell et al. |
| 8,072,470 B2 | 12/2011 | Marks |
| 2003/0030734 A1 | 2/2003 | Gibbs |
| 2003/0159567 A1* | 8/2003 | Subotnick ............... 84/626 |
| 2004/0176164 A1 | 9/2004 | Kobayashi |
| 2004/0189720 A1* | 9/2004 | Wilson et al. ............. 345/863 |
| 2004/0193413 A1* | 9/2004 | Wilson et al. ............. 704/243 |
| 2004/0207597 A1 | 10/2004 | Marks |
| 2004/0219980 A1 | 11/2004 | Bassett |
| 2004/0254982 A1 | 12/2004 | Hoffman |
| 2005/0059488 A1 | 3/2005 | Larsen et al. |
| 2006/0188144 A1 | 8/2006 | Sasaki et al. |
| 2006/0239558 A1 | 10/2006 | Rafii et al. |
| 2007/0013718 A1 | 1/2007 | Ohba |
| 2007/0021109 A1* | 1/2007 | Zellner ............... 455/418 |
| 2007/0021199 A1* | 1/2007 | Ahdoot ............... 463/30 |
| 2007/0060336 A1 | 3/2007 | Marks et al. |
| 2007/0098222 A1 | 5/2007 | Porter et al. |
| 2007/0216894 A1 | 9/2007 | Garcia et al. |
| 2007/0260984 A1 | 11/2007 | Marks et al. |
| 2007/0279485 A1 | 12/2007 | Ohba et al. |
| 2007/0283296 A1 | 12/2007 | Nilsson |
| 2007/0298882 A1 | 12/2007 | Marks et al. |
| 2008/0001951 A1 | 1/2008 | Marks et al. |
| 2008/0026838 A1 | 1/2008 | Dunstan et al. |
| 2008/0062257 A1 | 3/2008 | Corson |
| 2008/0070684 A1 | 3/2008 | Haigh-Hutchinson |
| 2008/0100620 A1 | 5/2008 | Nagai et al. |
| 2008/0126937 A1 | 5/2008 | Pachet |
| 2008/0129756 A1 | 6/2008 | Iwano |
| 2008/0134102 A1 | 6/2008 | Movold et al. |
| 2008/0152191 A1 | 6/2008 | Fujimura et al. |
| 2008/0215972 A1 | 9/2008 | Zalewski et al. |
| 2008/0215973 A1 | 9/2008 | Zalewski et al. |
| 2009/0141933 A1 | 6/2009 | Wagg |
| 2009/0167679 A1 | 7/2009 | Klier et al. |
| 2009/0220124 A1* | 9/2009 | Siegel ............... 382/103 |
| 2009/0221368 A1 | 9/2009 | Yen et al. |
| 2010/0259546 A1* | 10/2010 | Yomdin et al. ............. 345/473 |
| 2011/0102570 A1* | 5/2011 | Wilf et al. ............. 348/77 |
| 2011/0279368 A1* | 11/2011 | Klein et al. ............. 345/158 |
| 2012/0060177 A1* | 3/2012 | Stinson et al. ............. 725/12 |
| 2012/0194645 A1* | 8/2012 | Fuller et al. ............. 348/46 |

FOREIGN PATENT DOCUMENTS

| | | |
|---|---|---|
| JP | 08044490 A1 | 2/1996 |
| WO | 93/10708 A1 | 6/1993 |
| WO | 97/17598 A1 | 5/1997 |
| WO | WO 99/15863 A1 | 4/1999 |
| WO | 99/44698 A1 | 9/1999 |
| WO | WO 01/59975 A3 | 1/2002 |
| WO | WO 02/082249 A2 | 10/2002 |
| WO | WO 03/001722 A3 | 3/2003 |
| WO | WO 03/046706 A1 | 6/2003 |
| WO | WO 03/073359 A3 | 11/2003 |
| WO | WO 03/054683 A3 | 12/2003 |
| WO | WO 03/071410 A3 | 3/2004 |
| WO | WO 2009/059065 A1 | 5/2009 |

OTHER PUBLICATIONS

Shivappa et al., "Person Tracking with Audio-Visual Cues Using Iterative Decoding Framework", IEEE Fifth International Conference on Advanced Video and Signal Based Surveillance, AVSS '08, Santa Fe, NM, Sep. 1-3, 2008, 260-267.

Sanders, A.L., "Filming in the Digital World: Virtual "Cameras"," About.com, http://animation.about.com/od/moviemagic/a/virtualcamera.htm, downloaded Feb. 6, 2009, pp. 1-2.

Kanade et al., "A Stereo Machine for Video-rate Dense Depth Mapping and its New Applications", IEEE Computer Society Conference on Computer Vision and Pattern Recognition, 1996, pp. 196-202,The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

(56) References Cited

OTHER PUBLICATIONS

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

* cited by examiner

US 8,649,554 B2

METHOD TO CONTROL PERSPECTIVE FOR A CAMERA-CONTROLLED COMPUTER

PRIORITY

This application claims the benefit of U.S. Provisional Application No. 61/174,898, titled "Method to Control Perspective for a Camera-Controlled Computer" filed on May 1, 2009, which is hereby incorporated by reference in its entirety.

BACKGROUND OF THE INVENTION

Many computing applications such as computer games, multimedia applications, office applications or the like use controls to allow users to manipulate game characters or other aspects of an application. Typically such controls are input using, for example, controllers, remotes, keyboards, mice, or the like. Unfortunately, such controls can be difficult to learn, thus creating a barrier between a user and such games and applications. Furthermore, such controls may be different than actual game actions or other application actions for which the controls are used. For example, a game control via a controller that corresponds to moving an in-game camera to the right does not correspond to the user moving to the right himself or herself.

SUMMARY OF THE INVENTION

Disclosed herein are systems and methods for receiving data reflecting skeletal movement of a user, determining from that data whether the user has performed one or more gestures corresponding to changing the perspective displayed on a display device, and displaying the result of that changed perspective on the display. A perspective is a way that objects or a scene is displayed. Where the display is thought of as a window into or a camera capturing a scene rendered by a system, a perspective is how that scene is presented—at what level of zoom, what angle, and what objects are displayed or not displayed.

The system receives a series of image data from a camera. This camera may comprise a color camera (such as red-green-blue or RGB), a depth camera, or a three-dimensional (3D) camera. This data may comprise separate depth and color images, a combined image that incorporates depth and color information, or a parsed image where objects are identified, such as people that are skeletal mapped. This data captures motions or poses made by at least one user. Based on this image data, the system is able to parse gestures that the user intends to convey. The system detects the likelihood that the user has conveyed a gesture, by evaluating the data with one or more filters, each filter representing a gesture. Where the system determines that the data corresponds to the user making a gesture to change the perspective displayed on the display, the system will make the corresponding change and display the new perspective. For instance, where the user makes a "zoom in" gesture, the system will enlarge a portion of that which is currently displayed on the display.

The foregoing is a summary and thus contains, by necessity, simplifications, generalizations and omissions of detail. Those skilled in the art will appreciate that the summary is illustrative only and is not intended to be in any way limiting.

BRIEF DESCRIPTION OF THE DRAWINGS

The systems, methods, and computer readable media for controlling view perspective in accordance with this specification are further described with reference to the accompanying drawings in which.

DETAILED DESCRIPTION OF ILLUSTRATIVE EMBODIMENTS

Figure 1A:
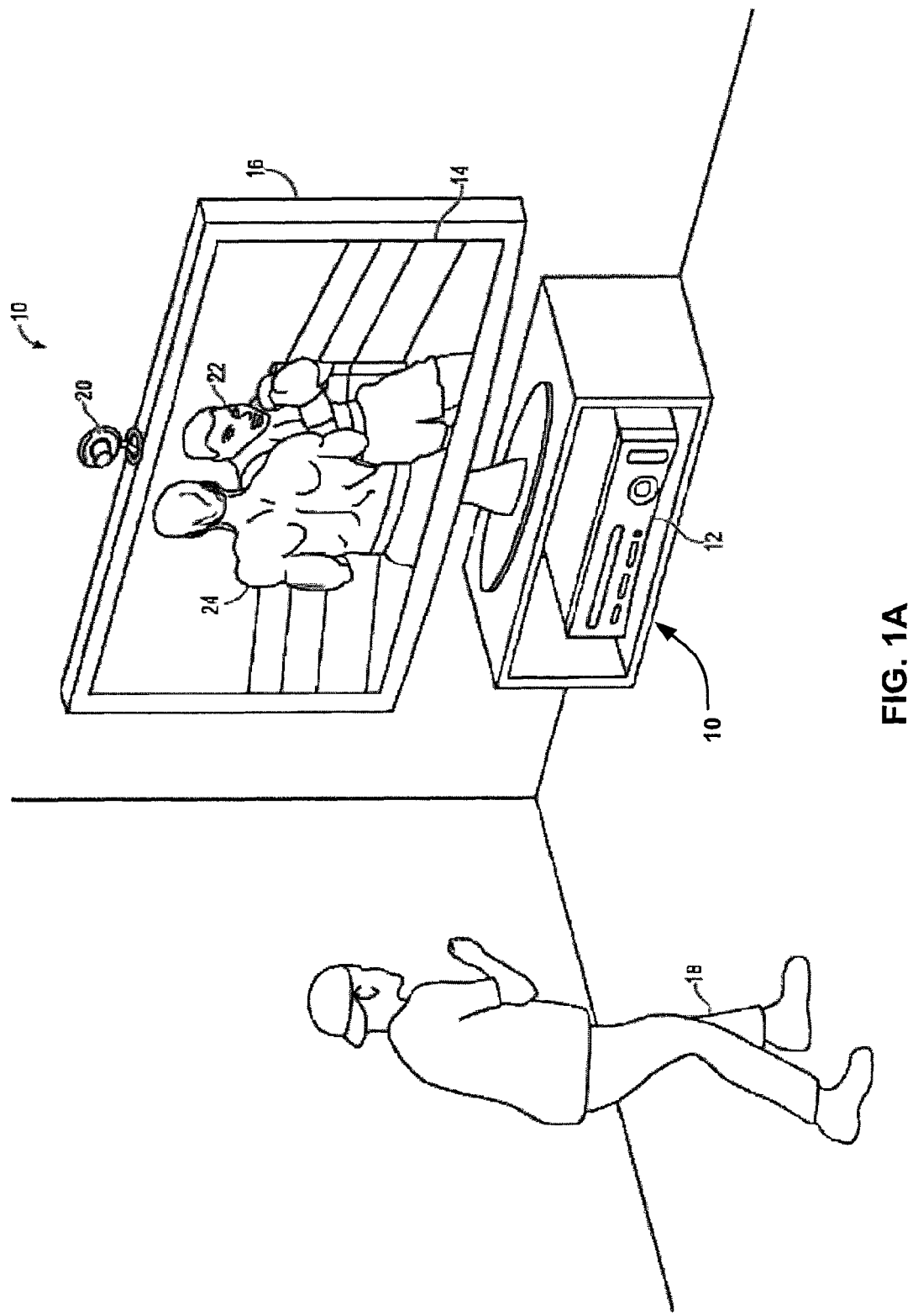
FIGS. 1A and 1B illustrate an example embodiment of a target recognition, analysis, and tracking system with a user playing a game.

As will be described herein, a user may interact with a virtual environment of an application executing on a computing environment such as a game console, a computer, or the like by performing one or more gestures, movements, or poses. Disclosed herein are systems and methods for controlling a perspective displayed on a display device through these gestures, movements, or poses.

To generate models representative of a target or object in a physical space, a capture device can capture a depth image of the physical space and scan targets in the scene. A target may include humans or other objects in the scene. In one embodiment, the capture device may determine whether one or more targets in the scene corresponds to a human target such as the user. To determine whether a target in the scene corresponds to a human target, each of the targets may be flood filled and compared to a pattern of a human body model. A target identified as a human may be scanned to generate a skeletal model associated therewith. The skeletal model may then be provided to a computing environment for tracking the skeletal model and rendering an avatar associated with the skeletal model. The computing environment may map the motions of the user in the physical space to a visual representation on a display device, such as an avatar. The computing environment may determine which controls to perform in an application executing on the computer environment based on, for example, gestures of the user that have been recognized and mapped to the skeletal model.

Some of the functional units described in this specification have been labeled as components, in order to more particularly emphasize their implementation independence. For example, a component may be implemented as a hardware circuit comprising custom VLSI circuits or gate arrays, off-the-shelf semiconductors such as logic chips, transistors, or other discrete components. A component may also be implemented in programmable hardware devices such as field programmable gate arrays, programmable array logic, programmable logic devices or the like.

Components may also be implemented in software for execution by various types of processors. An identified component of executable code may, for instance, comprise one or more physical or logical blocks of computer instructions which may, for instance, be organized as an object, procedure, or function. Nevertheless, the executables of an identified component need not be physically located together, but may comprise disparate instructions stored in different locations which, when joined logically together, comprise the component and achieve the stated purpose for the component.

The system, methods, and components of controlling perspective as described herein may be embodied in target recognition, analysis, and tracking system implemented in a multi-media console, such as a gaming console, or in any other computing device in which it is desired to provide visual assistance, by way of example and without any intended limitation, satellite receivers, set top boxes, arcade games, personal computers (PCs), portable telephones, personal digital assistants (PDAs), and other hand-held devices.

Figure 1B:
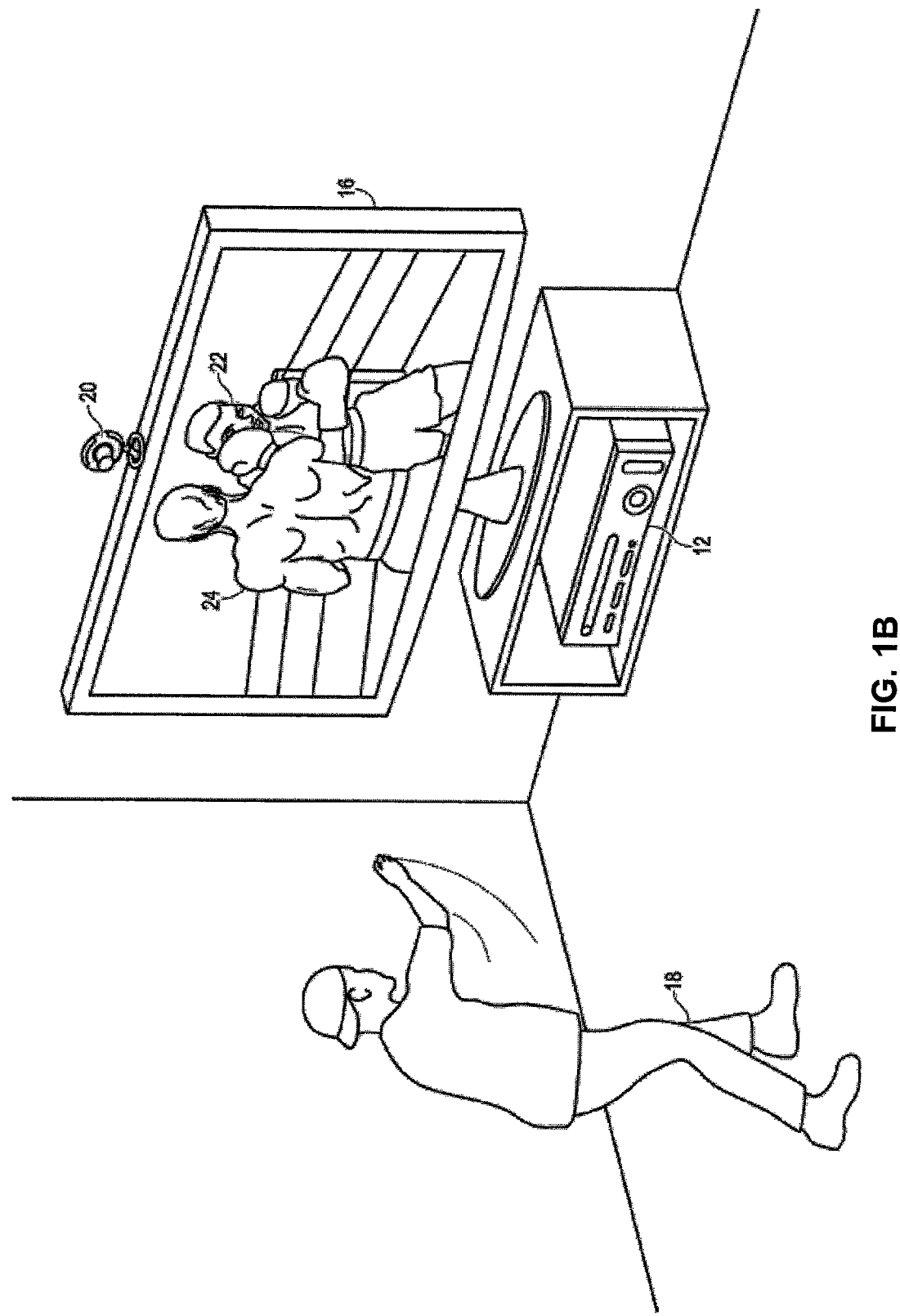

FIGS. 1A and 1B illustrate an example embodiment of a configuration of a target recognition, analysis, and tracking system 10 in which the system, methods, and components described herein for providing non-visual sensory feedback may be embodied. In the example shown, a user 18 is playing a boxing game. In an example embodiment, the target recognition, analysis, and tracking system 10 may be used to recognize, analyze, and/or track a human target such as the user 18.

As shown in FIG. 1A, the target recognition, analysis, and tracking system 10 may include a computing environment 12. The computing environment 12 may be a computer, a gaming system or console, or the like. According to an example embodiment, the computing environment 12 may include hardware components and/or software components such that the computing environment 12 may be used to execute applications such as gaming applications, non-gaming applications, or the like.

As shown in FIG. 1A, the target recognition, analysis, and tracking system 10 may further include a capture device 20. The capture device 20 may be, for example, a camera that may be used to visually monitor one or more users, such as the user 18, such that gestures performed by the one or more users may be captured, analyzed, and tracked to perform one or more controls or actions within an application, as will be described in more detail below.

According to one embodiment, the target recognition, analysis, and tracking system 10 may be connected to an audiovisual device 16 such as a television, a monitor, a high-definition television (HDTV), or the like that may provide game or application visuals and/or audio to a user such as the user 18. For example, the computing environment 12 may include a video adapter such as a graphics card and/or an audio adapter such as a sound card that may provide audiovisual signals associated with the game application, non-game application, or the like. The audiovisual device 16 may receive the audiovisual signals from the computing environment 12 and may then output the game or application visuals and/or audio associated with the audiovisual signals to the user 18. According to one embodiment, the audiovisual device 16 may be connected to the computing environment 12 via, for example, an S-Video cable, a coaxial cable, an HDMI cable, a DVI cable, a VGA cable, or the like.

The audiovisual device may comprise a three-dimensional (3-D) display device. Such a 3-D display device may use any of a variety of techniques to produce a 3-D image, such anaglyph images, the eclipse method, polarization filters, lenticular or barrier screens, autostereoscopic methods, and stereoscopic viewing devices. Some of these techniques, such as using anaglyph images, are effected through the user wearing special glasses. Other of these techniques, like the eclipse method, may be implemented without requiring of the user to wear glasses. In some embodiments, where techniques are used that rely on alternating images on the display device to produce a 3-D effect, the display device may refresh at a higher rate than the conventional 50 or 60 Hz, such as 100 or 120 Hz.

As shown in FIGS. 1A and 1B, the target recognition, analysis, and tracking system 10 may be used to recognize, analyze, and/or track a human target such as the user 18. For example, the user 18 may be tracked using the capture device 20 such that the movements of user 18 may be interpreted as controls that may be used to affect the application being executed by computer environment 12. Thus, according to one embodiment, the user 18 may move his or her body to control the application.

As shown in FIGS. 1A and 1B, in an example embodiment, the application executing on the computing environment 12 may be a boxing game that the user 18 may be playing. For example, the computing environment 12 may use the audiovisual device 16 to provide a visual representation of a boxing opponent 22 to the user 18. The computing environment 12 may also use the audiovisual device 16 to provide a visual representation of a player avatar 24 that the user 18 may control with his or her movements. For example, as shown in FIG. 1B, the user 18 may throw a punch in physical space to cause the player avatar 24 to throw a punch in game space. Thus, according to an example embodiment, the computer environment 12 and the capture device 20 of the target recognition, analysis, and tracking system 10 may be used to recognize and analyze the punch of the user 18 in physical space such that the punch may be interpreted as a game control of the player avatar 24 in game space.

Other movements by the user 18 may also be interpreted as other controls or actions, such as controls to bob, weave, shuffle, block, jab, or throw a variety of different power punches. Furthermore, some movements may be interpreted as controls that may correspond to actions other than controlling the player avatar 24. For example, the player may use movements to end, pause, or save a game, select a level, view high scores, communicate with a friend, etc.

In example embodiments, the human target such as the user 18 may have an object. In such embodiments, the user of an electronic game may be holding the object such that the motions of the player and the object may be used to adjust and/or control parameters of the game. For example, the motion of a player holding a racket may be tracked and utilized for controlling an on-screen racket in an electronic sports game. In another example embodiment, the motion of a player holding an object may be tracked and utilized for controlling an on-screen weapon in an electronic combat game.

According to other example embodiments, the target recognition, analysis, and tracking system 10 may further be used to interpret target movements as operating system and/or application controls that are outside the realm of games. For example, virtually any controllable aspect of an operating system and/or application may be controlled by movements of the target such as the user 18.

Figure 2:
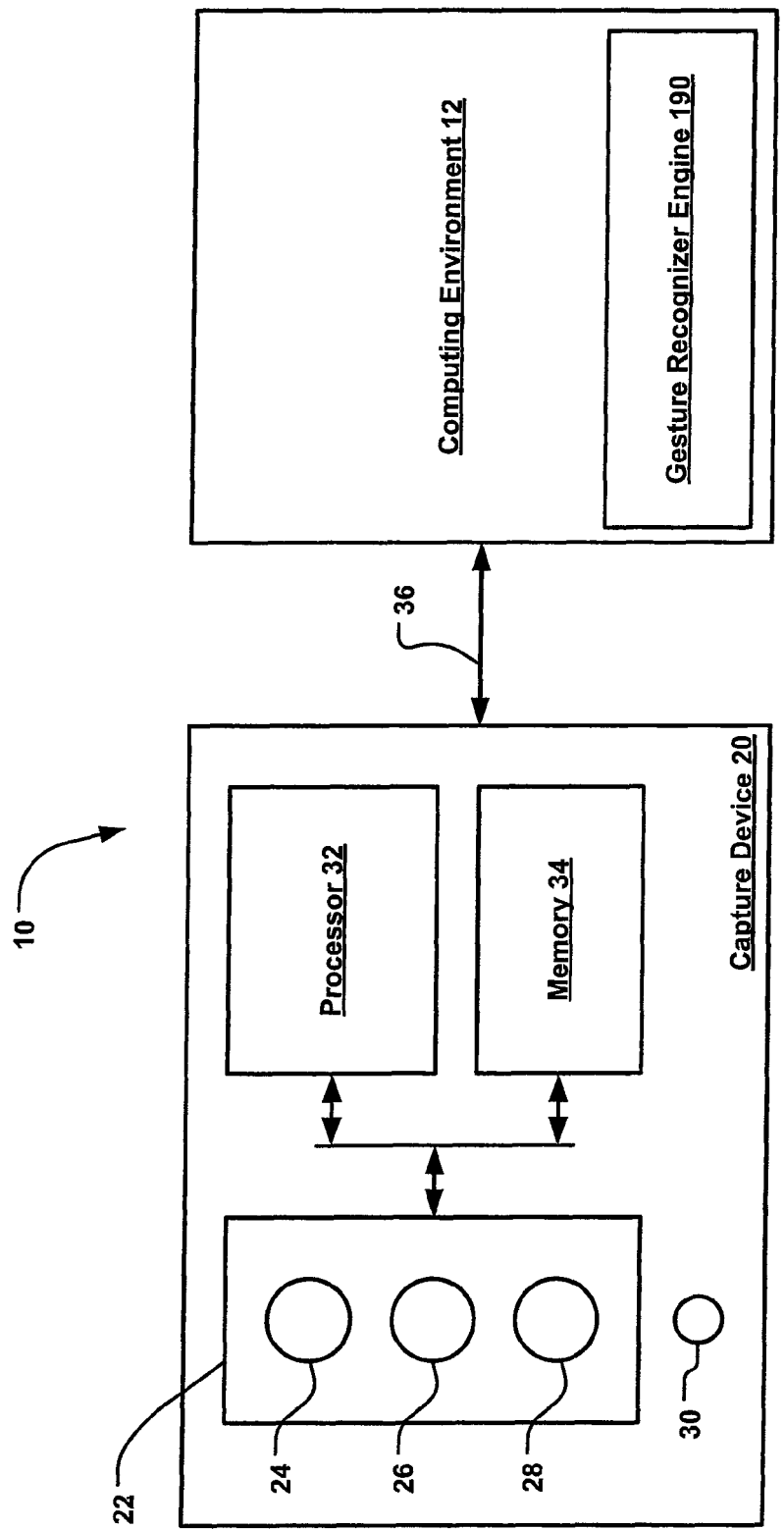
FIG. 2 illustrates an example embodiment of a capture device that may be used in a target recognition, analysis, and tracking system.

FIG. 2 illustrates an example embodiment of the capture device 20 that may be used in the target recognition, analysis, and tracking system 10. According to an example embodiment, the capture device 20 may be configured to capture video with depth information including a depth image that may include depth values via any suitable technique including, for example, time-of-flight, structured light, stereo image, or the like. According to one embodiment, the capture device 20 may organize the calculated depth information into "Z layers," or layers that may be perpendicular to a Z axis extending from the depth camera along its line of sight.

As shown in FIG. 2, the capture device 20 may include an image camera component 22. According to an example embodiment, the image camera component 22 may be a depth camera that may capture the depth image of a scene. The depth image may include a two-dimensional (2-D) pixel area of the captured scene where each pixel in the 2-D pixel area may represent a length in, for example, centimeters, millimeters, or the like of an object in the captured scene from the camera.

As shown in FIG. 2, according to an example embodiment, the image camera component 22 may include an IR light component 24, a three-dimensional (3-D) camera 26, and an RGB camera 28 that may be used to capture the depth image of a scene. For example, in time-of-flight analysis, the IR light component 24 of the capture device 20 may emit an infrared light onto the scene and may then use sensors (not shown) to detect the backscattered light from the surface of one or more targets and objects in the scene using, for example, the 3-D camera 26 and/or the RGB camera 28. In some embodiments, pulsed infrared light may be used such that the time between an outgoing light pulse and a corresponding incoming light pulse may be measured and used to determine a physical distance from the capture device 20 to a particular location on the targets or objects in the scene. Additionally, in other example embodiments, the phase of the outgoing light wave may be compared to the phase of the incoming light wave to determine a phase shift. The phase shift may then be used to determine a physical distance from the capture device to a particular location on the targets or objects.

According to another example embodiment, time-of-flight analysis may be used to indirectly determine a physical distance from the capture device 20 to a particular location on the targets or objects by analyzing the intensity of the reflected beam of light over time via various techniques including, for example, shuttered light pulse imaging.

In another example embodiment, the capture device 20 may use a structured light to capture depth information. In such an analysis, patterned light (i.e., light displayed as a known pattern such as grid pattern or a stripe pattern) may be projected onto the scene via, for example, the IR light component 24. Upon striking the surface of one or more targets or objects in the scene, the pattern may become deformed in response. Such a deformation of the pattern may be captured by, for example, the 3-D camera 26 and/or the RGB camera 28 and may then be analyzed to determine a physical distance from the capture device to a particular location on the targets or objects.

According to another embodiment, the capture device 20 may include two or more physically separated cameras that may view a scene from different angles, to obtain visual stereo data that may be resolved to generate depth information The capture device 20 may further include a microphone 30. The microphone 30 may include a transducer or sensor that may receive and convert sound into an electrical signal. According to one embodiment, the microphone 30 may be used to reduce feedback between the capture device 20 and the computing environment 12 in the target recognition, analysis, and tracking system 10. Additionally, the microphone 30 may be used to receive audio signals that may also be provided by the user to control applications such as game applications, non-game applications, or the like that may be executed by the computing environment 12.

In an example embodiment, the capture device 20 may further include a processor 32 that may be in operative communication with the image camera component 22. The processor 32 may include a standardized processor, a specialized processor, a microprocessor, or the like that may execute instructions that may include instructions for receiving the depth image, determining whether a suitable target may be included in the depth image, converting the suitable target into a skeletal representation or model of the target, or any other suitable instruction.

The capture device 20 may further include a memory component 34 that may store the instructions that may be executed by the processor 32, images or frames of images captured by the 3-D camera or RGB camera, or any other suitable information, images, or the like. According to an example embodiment, the memory component 34 may include random access memory (RAM), read only memory (ROM), cache, Flash memory, a hard disk, or any other suitable storage component. As shown in FIG. 2, in one embodiment, the memory component 34 may be a separate component in communication with the image capture component 22 and the processor 32. According to another embodiment, the memory component 34 may be integrated into the processor 32 and/or the image capture component 22.

As shown in FIG. 2, the capture device 20 may be in communication with the computing environment 12 via a communication link 36. The communication link 36 may be a wired connection including, for example, a USB connection, a Firewire connection, an Ethernet cable connection, or the like and/or a wireless connection such as a wireless 802.11b, g, a, or n connection. According to one embodiment, the computing environment 12 may provide a clock to the capture device 20 that may be used to determine when to capture, for example, a scene via the communication link 36.

Additionally, the capture device 20 may provide the depth information and images captured by, for example, the 3-D camera 26 and/or the RGB camera 28, and a skeletal model that may be generated by the capture device 20 to the computing environment 12 via the communication link 36. The computing environment 12 may then use the skeletal model, depth information, and captured images to, for example, recognize user gestures and in response control an application such as a game or word processor. For example, as shown, in FIG. 2, the computing environment 12 may include a gestures recognizer engine 190. The gestures recognizer engine 190 may include a collection of gesture filters, each comprising information concerning a gesture that may be performed by the skeletal model (as the user moves). The data captured by the cameras 26, 28 and device 20 in the form of the skeletal model and movements associated with it may be compared to the gesture filters in the gesture recognizer engine 190 to identify when a user (as represented by the skeletal model) has performed one or more gestures. Those gestures may be associated with various controls of an application. Thus, the computing environment 12 may use the gesture recognizer engine 190 to interpret movements of the skeletal model and to control an application based on the movements.

Figure 3A:
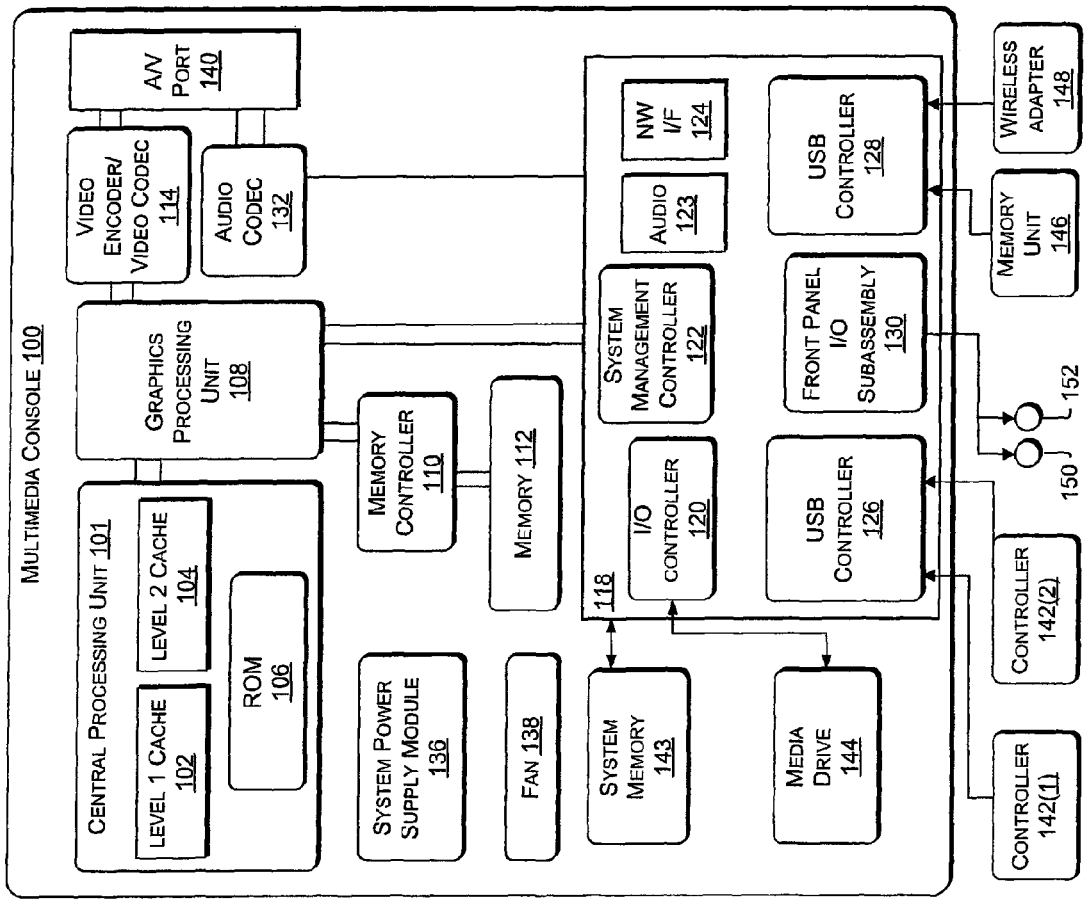
FIG. 3A illustrates an example embodiment of a computing environment that may be used to interpret one or more gestures in a target recognition, analysis, and tracking system.

FIG. 3A illustrates an example embodiment of a computing environment that may be used to interpret one or more gestures in a target recognition, analysis, and tracking system. The computing environment such as the computing environment 12 described above with respect to FIGS. 1A-2 may be a multimedia console 100, such as a gaming console. As shown in FIG. 3A, the multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches. The cameras 26, 28 and capture device 20 may define additional input devices for the console 100.

Figure 3B:
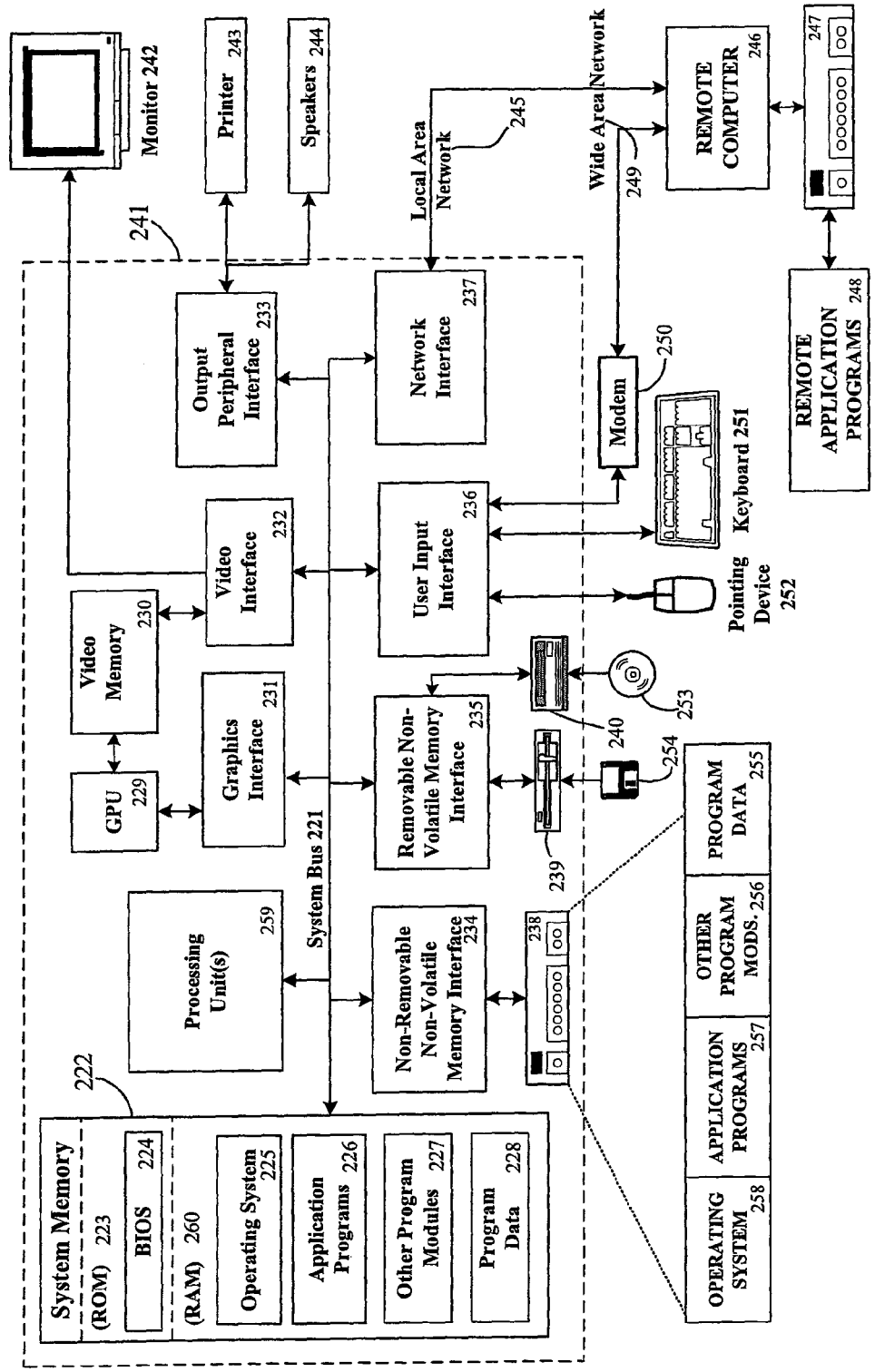
FIG. 3B illustrates another example embodiment of a computing environment that may be used to interpret one or more gestures in a target recognition, analysis, and tracking system.

FIG. 3B illustrates another example embodiment of a computing environment 220 that may be the computing environment 12 shown in FIGS. 1A-2 used to interpret one or more gestures in a target recognition, analysis, and tracking system. The computing system environment 220 is only one example of a suitable computing environment and is not intended to suggest any limitation as to the scope of use or functionality of the presently disclosed subject matter. Neither should the computing environment 220 be interpreted as having any dependency or requirement relating to any one or combination of components illustrated in the exemplary operating environment 220. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since the state of the art has evolved to a point where there is little difference between hardware, software, or a combination of hardware/software, the selection of hardware versus software to effectuate specific functions is a design choice left to an implementer. More specifically, a software process can be transformed into an equivalent hardware structure, and a hardware structure can itself be transformed into an equivalent software process. Thus, the selection of a hardware implementation versus a software implementation is one of design choice and left to the implementer.

In FIG. 3B, the computing environment 220 comprises a computer 241, which typically includes a variety of computer readable media. Computer readable media can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 3B illustrates operating system 225, application programs 226, other program modules 227, and program data 228.

The computer 241 may also include other removable/non-removable, volatile/nonvolatile computer storage media. By way of example only, FIG. 3B illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 3B, provide storage of computer readable instructions, data structures, program modules and other data for the computer 241. In FIG. 3B, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The cameras 26, 28 and capture device 20 may define additional input devices for the console 100. A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 3B. The logical connections depicted in FIG. 3B include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 3B illustrates remote application programs 248 as residing on memory device 247. It will be appreciated that the network connections shown are exemplary and other means of establishing a communications link between the computers may be used.

Figure 4A:
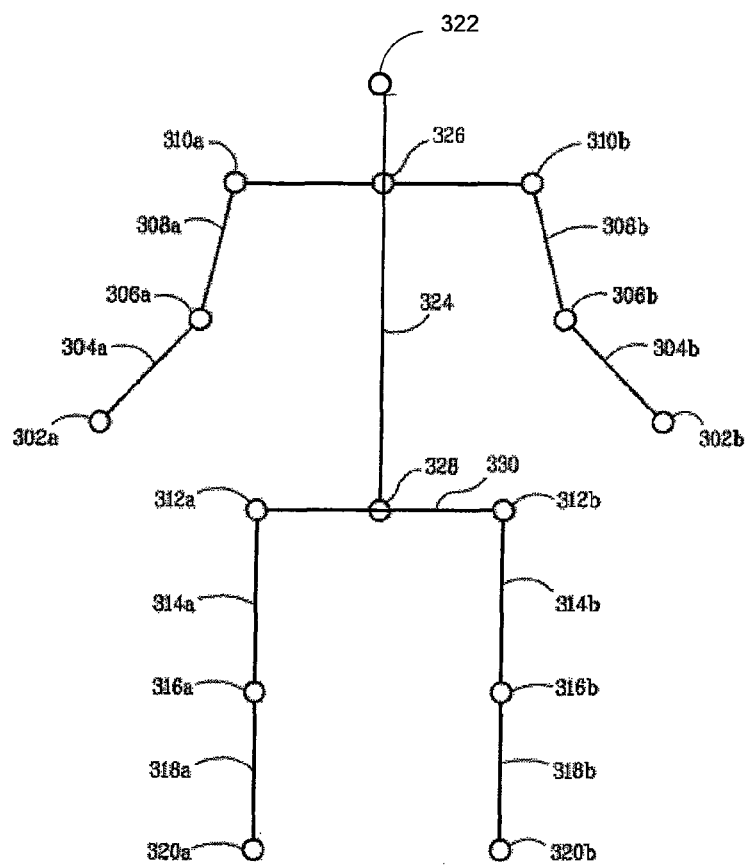
FIG. 4A illustrates a skeletal mapping of a user that has been generated from the target recognition, analysis, and tracking system of FIG. 2.

FIG. 4A depicts an example skeletal mapping of a user that may be generated from the capture device 20. In this embodiment, a variety of joints and bones are identified: each hand 302, each forearm 304, each elbow 306, each bicep 308, each shoulder 310, each hip 312, each thigh 314, each knee 316, each foreleg 318, each foot 320, the head 322, the torso 324, the top 326 and bottom 328 of the spine, and the waist 330. Where more points are tracked, additional features may be identified, such as the bones and joints of the fingers or toes, or individual features of the face, such as the nose and eyes.

Through moving his body, a user may create gestures. A gesture comprises a motion or pose by a user that may be captured as image data and parsed for meaning. A gesture may be dynamic, comprising a motion, such as mimicking throwing a ball. A gesture may be a static pose, such as holding one's crossed forearms 304 in front of his torso 324. A gesture may also incorporate props, such as by swinging a mock sword. A gesture may comprise more than one body part, such as clapping the hands 302 together, or a subtler motion, such as pursing one's lips.

Where gestures are recognized by a computing system (e.g. "a system-recognized gesture"), gestures may be used for input in a general computing context. For instance, various motions of the hands 302 or other body parts may correspond to common system wide tasks such as navigate up or down in a hierarchical list, open a file, close a file, and save a file. Gestures may also be used in a video-game-specific context, depending on the game. For instance, with a driving game, various motions of the hands 302 and feet 320 may correspond to steering a vehicle in a direction, shifting gears, accelerating, and breaking.

A user may generate a gesture that corresponds to walking or running, by walking or running in place himself. The user may alternately lift and drop each leg 312-320 to mimic walking without moving. The system may parse this gesture by analyzing each hip 312 and each thigh 314. A step may be recognized when one hip-thigh angle (as measured relative to a vertical line, wherein a standing leg has a hip-thigh angle of 0°, and a forward horizontally extended leg has a hip-thigh angle of 90°) exceeds a certain threshold relative to the other thigh. A walk or run may be recognized after some number of consecutive steps by alternating legs. The time between the two most recent steps may be thought of as a period. After some number of periods where that threshold angle is not met, the system may determine that the walk or running gesture has ceased.

Given a "walk or run" gesture, an application may set values for application-determined parameters associated with this gesture. These parameters may include the above threshold angle, the number of steps required to initiate a walk or run gesture, a number of periods where no step occurs to end the gesture, and a threshold period that determines whether the gesture is a walk or a run. A fast period may correspond to a run, as the user will be moving his legs quickly, and a slower period may correspond to a walk.

A gesture may be associated with a set of default parameters at first that the application may override with its own parameters. In this scenario, an application is not forced to provide parameters, but may instead use a set of default parameters that allow the gesture to be recognized in the absence of application-defined parameters.

There are a variety of outputs that may be associated with the gesture. There may be a baseline "yes or no" as to whether a gesture is occurring. There also may be a confidence level, which corresponds to the likelihood that the user's tracked movement corresponds to the gesture. This could be a linear scale that ranges over floating point numbers between 0 and 1, inclusive. Wherein an application receiving this gesture information cannot accept false-positives as input, it may use only those recognized gestures that have a high confidence level, such as at least 0.95. Where an application must recognize every instance of the gesture, even at the cost of false-positives, it may use gestures that have at least a much lower confidence level, such as those merely greater than 0.2. The gesture may have an output for the time between the two most recent steps, and where only a first step has been registered, this may be set to a reserved value, such as −1 (since the time between any two steps must be positive). The gesture may also have an output for the highest thigh angle reached during the most recent step.

Another exemplary gesture is a "heel lift jump." In this, a user may create the gesture by raising his heels off the ground, but keeping his toes planted. Alternatively, the user may jump into the air where his feet 320 leave the ground entirely. The system may parse the skeleton for this gesture by analyzing the angle relation of the shoulders 310, hips 312 and knees 316 to see if they are in a position of alignment equal to standing up straight. Then these points and upper 326 and lower 328 spine points may be monitored for any upward acceleration. A sufficient combination of acceleration may trigger a jump gesture.

Given this "heel lift jump" gesture, an application may set values for application-determined parameters associated with this gesture. The parameters may include the above acceleration threshold, which determines how fast some combination of the user's shoulders 310, hips 312 and knees 316 must move upward to trigger the gesture, as well as a maximum angle of alignment between the shoulders 310, hips 312 and knees 316 at which a jump may still be triggered.

The outputs may comprise a confidence level, as well as the user's body angle at the time of the jump.

Setting parameters for a gesture based on the particulars of the application that will receive the gesture is important in accurately identifying gestures. Properly identifying gestures and the intent of a user greatly helps in creating a positive user experience. Where a gesture recognizer system is too sensitive, and even a slight forward motion of the hand 302 is interpreted as a throw, the user may become frustrated because gestures are being recognized where he has no intent to make a gesture, and thus, he lacks control over the system. Where a gesture recognizer system is not sensitive enough, the system may not recognize conscious attempts by the user to make a throwing gesture, frustrating him in a similar manner. At either end of the sensitivity spectrum, the user becomes frustrated because he cannot properly provide input to the system.

Another parameter to a gesture may be a distance moved. Where a user's gestures control the actions of an avatar in a virtual environment, that avatar may be arm's length from a ball. If the user wishes to interact with the ball and grab it, this may require the user to extend his arm 302-310 to full length while making the grab gesture. In this situation, a similar grab gesture where the user only partially extends his arm 302-310 may not achieve the result of interacting with the ball.

A gesture or a portion thereof may have as a parameter a volume of space in which it must occur. This volume of space may typically be expressed in relation to the body where a gesture comprises body movement. For instance, a football throwing gesture for a right-handed user may be recognized only in the volume of space no lower than the right shoulder 310a, and on the same side of the head 322 as the throwing arm 302a-310a. It may not be necessary to define all bounds of a volume, such as with this throwing gesture, where an outer bound away from the body is left undefined, and the volume extends out indefinitely, or to the edge of scene that is being monitored.

Figure 4B:
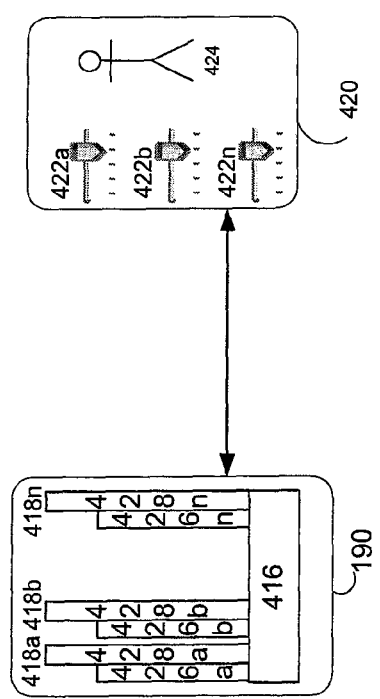
FIG. 4B illustrates further details of the gesture recognizer architecture shown in FIG. 2.

FIG. 4B provides further details of one exemplary embodiment of the gesture recognizer engine 190 of FIG. 2. As shown, the gesture recognizer engine 190 may comprise at least one filter 418 to determine a gesture or gestures. A filter 418 comprises information defining a gesture 426 (hereinafter referred to as a "gesture") along with parameters 428, or metadata, for that gesture. For instance, a throw, which comprises motion of one of the hands from behind the rear of the body to past the front of the body, may be implemented as a gesture 426 comprising information representing the movement of one of the hands of the user from behind the rear of the body to past the front of the body, as that movement would be captured by the depth camera. Parameters 428 may then be set for that gesture 426. Where the gesture 426 is a throw, a parameter 428 may be a threshold velocity that the hand has to reach, a distance the hand must travel (either absolute, or relative to the size of the user as a whole), and a confidence rating by the recognizer engine that the gesture occurred. These parameters 428 for the gesture 426 may vary between applications, between contexts of a single application, or within one context of one application over time.

Filters may be modular or interchangeable. In an embodiment, a filter has a number of inputs, each of those inputs having a type, and a number of outputs, each of those outputs having a type. In this situation, a first filter may be replaced with a second filter that has the same number and types of inputs and outputs as the first filter without altering any other aspect of the recognizer engine architecture. For instance, there may be a first filter for driving that takes as input skeletal data and outputs a confidence that the gesture associated with the filter is occurring and an angle of steering. Where one wishes to substitute this first driving filter with a second driving filter—perhaps because the second driving filter is more efficient and requires fewer processing resources—one may do so by simply replacing the first filter with the second filter so long as the second filter has those same inputs and outputs—one input of skeletal data type, and two outputs of confidence type and angle type.

A filter need not have a parameter. For instance, a "user height" filter that returns the user's height may not allow for any parameters that may be tuned. An alternate "user height" filter may have tunable parameters—such as to whether to account for a user's footwear, hairstyle, headwear and posture in determining the user's height.

Inputs to a filter may comprise things such as joint data about a user's joint position, like angles formed by the bones that meet at the joint, RGB color data from the scene, and the rate of change of an aspect of the user. Outputs from a filter may comprise things such as the confidence that a given gesture is being made, the speed at which a gesture motion is made, and a time at which a gesture motion is made.

In an embodiment, a gesture filter comprises A filter may comprise code and associated data that can recognize gestures or otherwise process depth, RGB, or skeletal data. For instance, a "user height" gesture filter may take a skeletal map of a user as input, process that data, and return an output of the height of the user as calculated by the code and associated data.

A context may be a cultural context, and it may be an environmental context. A cultural context refers to the culture of a user using a system. Different cultures may use similar gestures to impart markedly different meanings. For instance, an American user who wishes to tell another user to "look" or "use his eyes" may put his index finger on his head close to the distal side of his eye. However, to an Italian user, this gesture may be interpreted as a reference to the mafia.

Similarly, there may be different contexts among different environments of a single application. Take a first-person shooter game that involves operating a motor vehicle. While the user is on foot, making a first with the fingers towards the ground and extending the first in front and away from the body may represent a punching gesture. While the user is in the driving context, that same motion may represent a "gear shifting" gesture. There may also be one or more menu environments, where the user can save his game, select among his character's equipment or perform similar actions that do not comprise direct game-play. In that environment, this same gesture may have a third meaning, such as to select something or to advance to another screen.

The gesture recognizer engine 190 may have a base recognizer engine 416 that provides functionality to a gesture filter 418. In an embodiment, the functionality that the recognizer engine 416 implements includes an input-over-time archive that tracks recognized gestures and other input, a Hidden Markov Model implementation (where the modeled system is assumed to be a Markov process—one where a present state encapsulates any past state information necessary to determine a future state, so no other past state information must be maintained for this purpose—with unknown parameters, and hidden parameters are determined from the observable data), as well as other functionality required to solve particular instances of gesture recognition.

Filters 418 are loaded and implemented on top of the base recognizer engine 416 and can utilize services provided by the engine 416 to all filters 418. In an embodiment, the base recognizer engine 416 processes received data to determine whether it meets the requirements of any filter 418. Since these provided services, such as parsing the input, are provided once by the base recognizer engine 416 rather than by each filter 418, such a service need only be processed once in a period of time as opposed to once per filter 418 for that period, so the processing required to determine gestures is reduced.

An application may use the filters 418 provided by the recognizer engine 190, or it may provide its own filter 418, which plugs in to the base recognizer engine 416. In an embodiment, all filters 418 have a common interface to enable this plug-in characteristic. Further, all filters 418 may utilize parameters 428, so a single gesture tool as described below may be used to debug and tune the entire filter system 418.

These parameters 428 may be tuned for an application or a context of an application by a gesture tool 420. In an embodiment, the gesture tool 420 comprises a plurality of sliders 422, each slider 422 corresponding to a parameter 428, as well as a pictoral representation of a body 424. As a parameter 428 is adjusted with a corresponding slider 422, the body 424 may demonstrate both actions that would be recognized as the gesture with those parameters 428 and actions that would not be recognized as the gesture with those parameters 428, identified as such. This visualization of the parameters 428 of gestures provides an effective means to both debug and fine tune a gesture.

FIG. 5 depicts more complex gestures or filters 418 created from stacked gestures or filters 418. Gestures can stack on each other. That is, more than one gesture may be expressed by a user at a single time. For instance, rather than disallowing any input but a throw when a throwing gesture is made, or requiring that a user remain motionless save for the components of the gesture (e.g. stand still while making a throwing gesture that involves only one arm). Where gestures stack, a user may make a jumping gesture and a throwing gesture simultaneously, and both of these gestures will be recognized by the gesture engine.

Figure 5A:
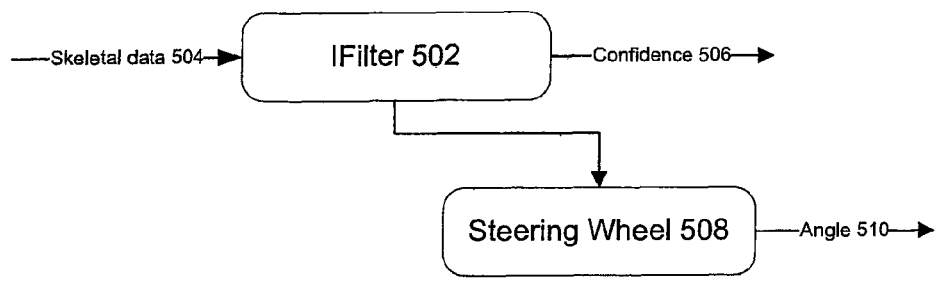
FIGS. 5A and 5B illustrate how gesture filters may be stacked to create more complex gesture filters.

FIG. 5A depicts a simple gesture filter 418 according to the stacking paradigm. The IFilter filter 502 is a basic filter 418 that may be used in every gesture filter. IFilter 502 takes user position data 504 and outputs a confidence level 506 that a gesture has occurred. It also feeds that position data 504 into a Steering Wheel filter 508 that takes it as an input and outputs an angle to which the user is steering (e.g. 40 degrees to the right of the user's current bearing) 510.

Figure 5B:
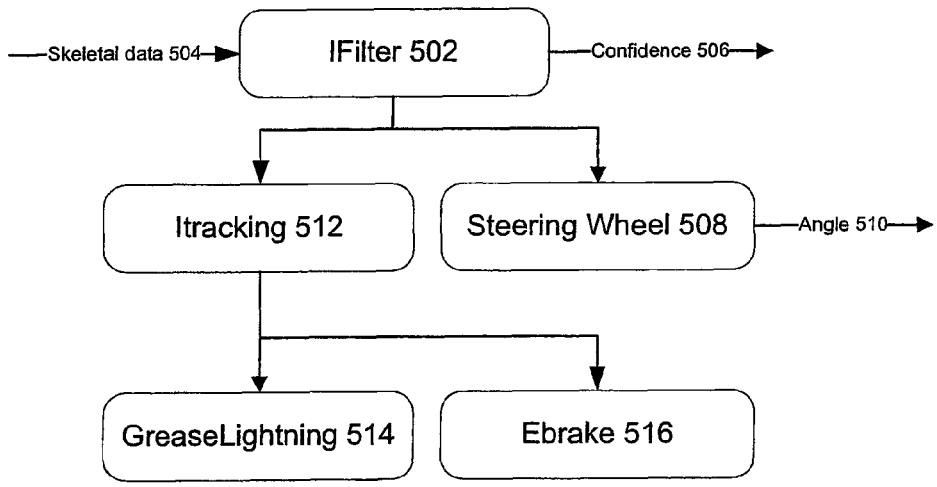

FIG. 5B depicts a more complex gesture that stacks filters 418 onto the gesture filter of FIG. 5A. In addition to IFilter 502 and Steering Wheel 508, there is an ITracking filter 512 that receives position data 504 from IFilter 502 and outputs the amount of progress the user has made through a gesture 514. ITracking 512 also feeds position data 504 to GreaseLightning 516 and EBrake 518, which are filters 418 regarding other gestures that may be made in operating a vehicle, such as using the emergency brake.

Figure 6A:
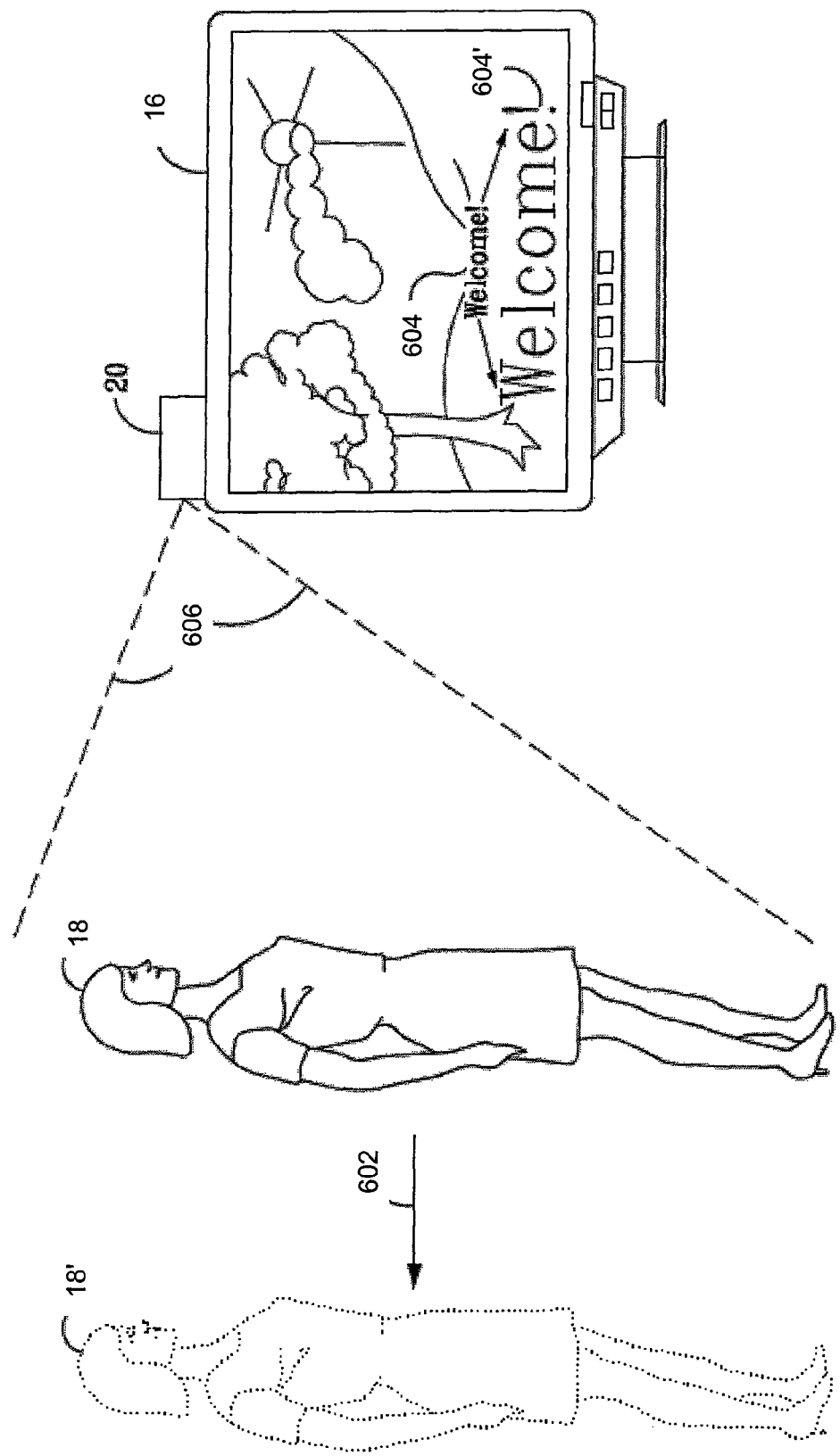
FIG. 6A illustrates a user controlling a perspective on a display through captured gestures.

FIG. 6A illustrates a user 18 controlling a perspective 12 on a display 22 through captured gestures. As user 18 changes her distance from capture device 20, the text 12 displayed on display device 22 is modified, so that when user 18 is far away from capture device 20, the text is large and readable, and when user 18 is close to capture device 20, the text is shrunk to a size that is still readable, but that occupies less of the display area.

A capture device 20 captures a scene 30 containing at least part of user 18. Based on the user's proximity to capture device 20, a font size is selected for displaying message "Welcome!" 12 on display device 22. User 18 may move 40 from user position 18 to user position 18', while still remaining in scene 30. Capture device 20 will detect this, parse this gesture of movement 40 to determine that user 18 has moved further away from capture device 20, and based on that increase the font size for message "Welcome!" 12' and display message "Welcome!" 12' on display device 22 in place of message "Welcome!" 12.

Where user 18 is far from the display device 22, he may have trouble seeing what is displayed. It would improve the user experience if part of the scene were magnified to aid in seeing it. Thus, a gesture may be user's 18 distance from the display device 22 to determine a level of magnification for the display. Likewise, as user 18 approaches the display device 22, the magnification may be decreased, or even shrunk smaller than a default size. As the display device 22 may not always be in a known position relative to the capture device, user's 18 distance from the capture device may be used to perform a similar magnification.

It is not necessary that all of what is displayed be magnified. In some situations, it may be that only the text is unreadable from the user's 18 distance, but the rest of what is displayed is of an appropriate size. In this case, it may be determined that only the text is to be magnified based on user's 18 distance. In another embodiment, it may be determined that the playable area is to be magnified, but some other elements, such as a logo for the application, are to remain a fixed size.

Figure 6B:
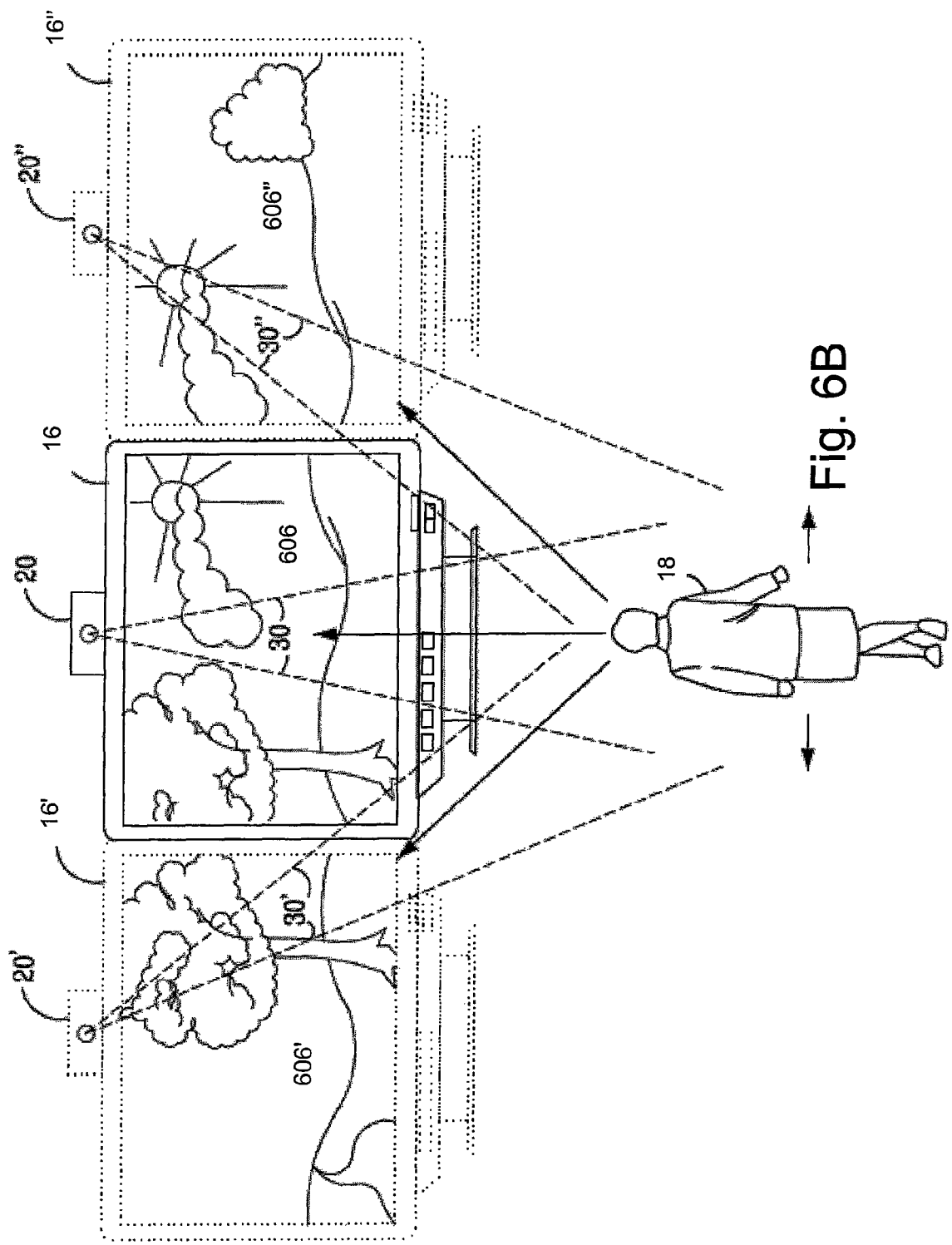
FIG. 6B illustrates a user controlling a perspective on a display through captured gestures.

FIG. 6B illustrates a user 18 controlling a perspective on a display 22 through captured gestures. In this embodiment, display 22 offers a parallax view, or a view into a virtual world as if display 22 were a window into that world. This may be thought of as the displayed scene being that from a larger scene that is viewable by the angles and planes created from user's 18 eyes or head to the borders of the display 22.

As user 18 moves to her right (reflected by user 18's relative position to capture device 20', display device 22' and captured scene 30', where capture device 20 and display device 22 remain in a set position), the scene displayed by display device 22 changes from 22 to 22'.

Likewise as user 18 moves to her left (reflected by user 18's relative position to capture device 20", display device 22" and captured scene 30", where capture device 20 and display device 22 remain in a set position), the scene displayed by display device changes from 22 or 22' (depending on user's 18 starting point) to 22". Thus, as illustrated, the perspective of the scene displayed to the user changes to match the user's viewing position (distance, angle, etc.), so that the user perceives he/she is viewing a real scene through the "window" defined by the edges of the display. It is as if the edges of the display are a window on the scene through which the user is viewing the scene. As in the case of a real window, when a person moves relative to the window, his perspective of the scene on the other side of the window changes depending on his position. By monitoring the position of (and gestures made by) user 18 relative to the display device 22 using the capture device 20, the perspective of the scene displayed to user 18 can be changed to mimic the change in perspective that would occur if the display were a real window to that scene.

Other ways that the perspective may be altered include a change from a first preset to a second preset, a dolly, a crane, a zoom, a pan, a tilt, a truck, and a cant, or some combination thereof.

A change from a first preset to a second preset may comprise alternating among a group of preset gestures offered by an application. For instance, a football video game may offer a first-person view from the viewpoint of a player being controlled by a user, an elevated-behind-the-offense view, a ground-level-behind-the-offense view, an elevated-behind-the-defense view, and a ground-level-behind-the-defense view. A change from a first preset to a second preset may comprise a change from the first-person view from the viewpoint of a player being controlled by a user to one of the other above four presets.

The other perspectives may be best thought of where the display device is thought of as a camera capturing the scene that the display device is seeing. Using that paradigm, a dolly comprises a move of the camera forward of backwards. A crane comprises a move of the camera up or down. A zoom comprises changing the focal length with the lens of the camera to produce a close up of part of the scene or to capture more of the scene than is presently displayed. A pan comprises rotating the camera on its horizontal axis. A tilt comprises rotating the camera on its vertical axis. A truck comprises moving the camera laterally. A cant comprises putting the camera in an oblique position.

A variety of user gestures may correspond to a change in perspective. For instance, a user may change the perspective via a truck to the user's right by extending his right hand to his right. In another example, a user may change the perspective via a pan to the user's right by holding his hand towards capture device 20 and rotating that hand clockwise.

Figure 7:
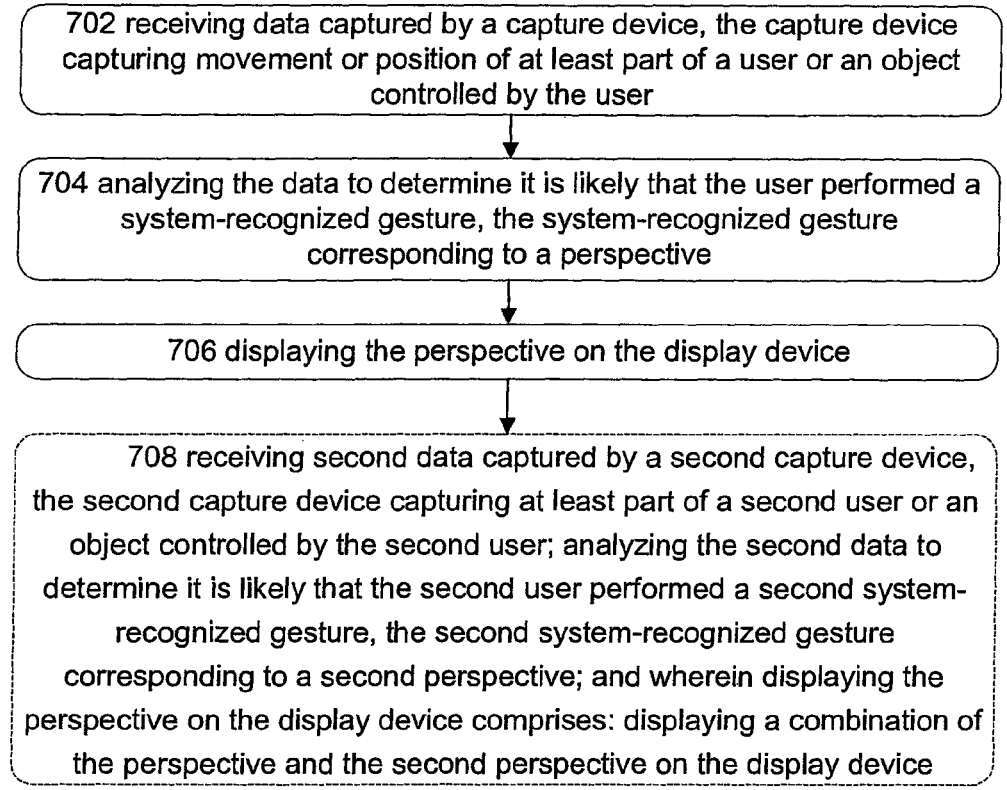
FIG. 7 illustrates exemplary operational procedures for using user movement captured with a capture device to control the perspective presented on a display.

FIG. 7 depicts exemplary operational procedures for using captured user gestures to control a perspective displayed on a display device.

Operation 702 depicts receiving data captured by a capture device, the capture device capturing position or movement of at least part of a user, or an object controlled by the user. The capture device may capture a scene that contains all of the user, such as from the floor to the ceiling and to the wall on each side of a room at the distance in which the user is located. The capture device may also capture a scene that contains only part of the user, such as the user from the abdomen up as he sits at a desk. The capture device may also capture an object controlled by the user, such as a prop camera that the user holds in his hand.

Operation 704 depicts analyzing the data to determine it is likely that the user performed a system-recognized gesture, the system-recognized gesture corresponding to a perspective. In an embodiment, this comprises applying a filter to the data, the filter corresponding to the system-recognized gesture, the system-recognized gesture corresponding to a perspective, and determining from the filter that the data is indicative of the system-recognized gesture being performed.

In an embodiment, determining from the filter that the data is indicative of the gesture being performed comprises a confidence level that the gesture corresponding to the filter has been performed. This confidence level may be output once, or it may be output continuously in response to received data. In an embodiment, this comprises determining a confidence level that the user has moved in such a way as to meet any requirements of the gesture (such as the hand being above the head) that are independent of any parameters. In an embodiment, this output may comprise a boolean determination as to whether the gesture corresponding to the filter occurred.

Where the filter comprises a parameter, the parameter may be a threshold, such as arm velocity is greater than X. It may be an absolute, such as arm velocity equals X. There may be a fault tolerance, such as arm velocity equals within Y of X. It may also comprise a range, such as arm velocity is greater than or equal to X, but less than Z. From the received data, the characteristics of that data that apply to the parameter may be determined, and then compared to the requirements of the parameter.

In an embodiment, the user also uses his voice to make, augment, distinguish or clarify a gesture. In this embodiment, operation 704 comprises receiving voice data and determining that a combination of the data and the voice data is indicative of the gesture. For instance the user may use his body to make the "pan right" gesture and use the sound of his voice to convey how fast the pan should occur, with the speed of the pan linearly correlated to the decibel (dB) level of the user's voice.

In an embodiment, the gesture may comprise a plurality of gestures. For instance, the user may be making the motions corresponding to "pan right" and "dolly forward" simultaneously.

In an embodiment, the gesture comprises a distance from the display device or the capture device, and the new perspective comprises a magnification. In an embodiment, the magnification comprises magnification of text or magnification of a scene on the display device.

Operation 706 depicts displaying the perspective on the display device.

In an embodiment, the display device displays a scene comprising an unaffected portion and an affected portion, and displaying the new perspective on the display device comprises displaying the new perspective on the affected portion of the scene of the display device. For instance, statistics about a game may be presented near a border of a display. In a first person shooter game, this may include a map, an amount of health the user-controlled character has, and an amount of ammunition the user-controlled character has. The remainder of the display may be devoted to showing the game area. In an embodiment, the game area portion of the display may be the affected portion, and the statistics portion of the display may be the unaffected area. Thus, when a new perspective is to be displayed, it will be displayed only on the game area portion, and the statistics portion will remain constant. For instance, as the user pans to the right, the game area portion will display that portion but the statistics will still be displayed in their constant location.

In an embodiment, the display device displays a scene, and the perspective comprises moving the scene in a direction corresponding to a vector of movement of the user, the vector of movement being coplanar with a plane of the display surface or a plane of a lens of the capture device. In an embodiment, when the user moves to his left or right, the perspective may shift to the user's left or right, respectively, to follow him. Likewise, when the user stands up or crouches, the perspective may move up or down, respectively, to follow him. As the user may not be able to move in a direction precisely coplanar with the display, in an embodiment, only that vector of his movement that is coplanar is used for the perspective. In an embodiment, the display surface is not planar and/or the capture device lens is not planar. In such an embodiment, coplanar movement may be considered to be that movement which does not increase or decrease the user's distance from either the display or the capture device.

In an embodiment, the display device displays a scene, and the display surface may be considered a window into viewing that scene.

Optional operation 708 depicts receiving second data captured by a second capture device, the second capture device capturing at least part of a second user or an object controlled by the second user; analyzing the second data to determine it is likely that the second user performed a second system-recognized gesture, the second system-recognized gesture corresponding to a second perspective; and wherein displaying the perspective on the display device comprises: displaying a combination of the perspective and the second perspective on the display device.

In an embodiment, analyzing the second data to determine it is likely that the second user performed a second system-recognized gesture, the second system-recognized gesture corresponding to a second perspective comprises applying a second filter to the data, the second filter corresponding to a second system-recognized gesture, the second system-recognized gesture corresponding to a second perspective, and determining from the second filter that the second data is indicative of the second gesture being performed.

Multiple users may affect the perspective at the same time. They may both be in the same physical area and captured by the same capture device, or communicating with each other remotely across a communications network and captured with respective communications devices.

In an embodiment, the perspective is displayed on a first portion of the display device, and the second perspective is displayed on a second portion of the display device. For instance, the two users may be playing a first-person shooter game, and the display device may be displaying a split-screen view, where one portion of the display is devoted to the user's viewpoint of the game, and the other portion is devoted to the second user's viewpoint of the game. In this embodiment, where the user changes the perspective, it will change the perspective only in that portion of the display devoted to his viewpoint, and where the second user changes the perspective, it will change the perspective only in that portion of the display devoted to his viewpoint.

In an embodiment, the gesture corresponds to a physical location of the user, the second gesture corresponds to a physical location of the second user, and a combination of the first perspective and the second perspective comprises a perspective corresponding to an average physical location of the user and the second user. Where two users share a perspective, the perspective may be a "best middle-ground" for the two users. This may be achieved, for instance, by determining a mid-point in the physical space of the user and the second user and presenting a perspective as if it were for a single user located at that mid-point.

It may be determined that one of the two users needs the perspective to be based more on his actual physical location, such as if his eyesight is poor, or he easily becomes nauseous when interacting with a virtual world. In such a case, a weighted mid-point may be used as above, that favors that user's perspective. This may be determined, for instance, through explicit instruction from one of the users, or by determining that one user is less adroit at interacting with an executing program than the other user.

In an embodiment, displaying a combination of the first perspective and the second perspective comprises displaying a the perspective overlaid on the second perspective or the second perspective overlaid on the perspective. Two different perspectives may be displayed on the display device simultaneously, but they may be distinguished based on how they are displayed.

In an embodiment, each perspective is tinted with a unique color. This may comprise complimentary colors, such as red and green, blue and orange, or purple and yellow. Where the colors are red and green, one user may wear red-tinted glasses to filter out the red perspective and see only the green perspective, and the other user may wear green-tinted glasses to filter out the green perspective and see only the red perspective In an embodiment, one of the perspective and the second perspective comprises an infrared image one of the perspective and the second perspective comprises a color image.

In an embodiment, a perspective comprises a plurality of attributes, and the perspective comprises a first attribute of the plurality of attributes and the second perspective comprises a second attribute of the plurality of attributes. An attribute may comprise a dolly, a crane, a zoom, a pan, a tilt, a truck, and a cant. Where a plurality of users share a perspective, they may control different aspects of it. For instance, one user may control what is generally being seen by the perspective (e.g. what is in the field of view, or craning, panning, tilting, trucking, etc) and another user may control a level of magnification for what is being seen.

In an embodiment, each user is using a separate computing environment 12 and communicating across a communications network. This may comprise an online multi-player gaming session. For instance, the two users may be playing a first-person shooter game, and each user's display has a split-screen. Here, part of each user's screen may show his own perspective, and part of his screen may show the other user's perspective. As the second user makes body movement, gestures or poses to control perspective, that change of perspective is displayed on the first user's screen according to the above techniques.

Figure 8A:
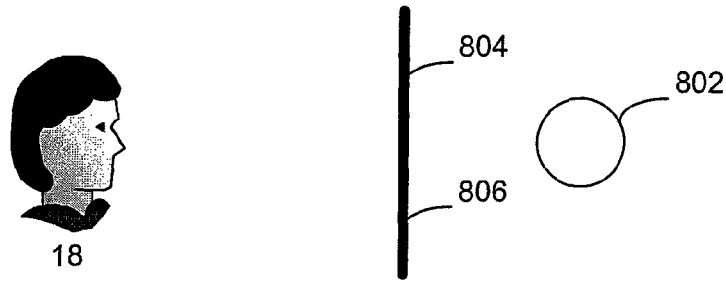
FIG. 8A depicts user 18 in front of display device, which displays virtual object.

FIG. 8A depicts user 18 in front of display device 804, which displays virtual object 802. The virtual object 802 is rendered in a 3-D scene. The user's 18 head position is tracked and used as a camera offset to an imaginary 3-D point in the rendered scene, providing a parallax view. As user 18 moves his head in his physical space, a camera from which the viewable portion of the virtual scene is observed moves in a corresponding manner. To match the view that user 18 has to his display device 804, the camera's view matrix is manipulated based on an identically sized and aligned surface 806 in the virtual environment. The camera's view is changed so that it can see through this view screen 806, but nothing to the side, above or below it. This way, the display device 804 feels as though it is a "pure" portal, and an illusion of parallax 3-D is maintained. Additionally, as user 18 moves towards or away from display device 804, mapping the view matrix to this surface 806 means that the field of view is increased or decreased, respectively, furthering this feel of a portal.

Figure 8B:
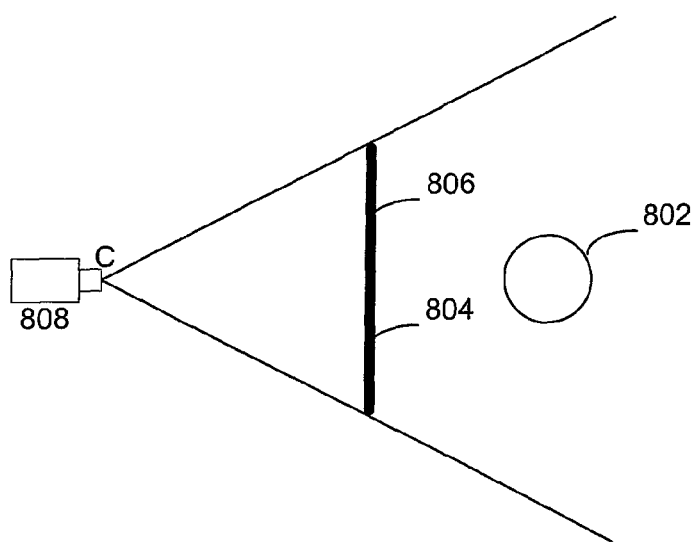
FIG. 8B illustrates the camera perspective of FIG. 8A from the perspective of the user in FIG. 8A.

FIG. 8B illustrates the camera perspective of FIG. 8A from the perspective of user 18 in FIG. 8A. The surface 806 is in the same spot as the display device 804, and the virtual object 802 remains in the same relative position as in FIG. 8A.

Figure 8C:
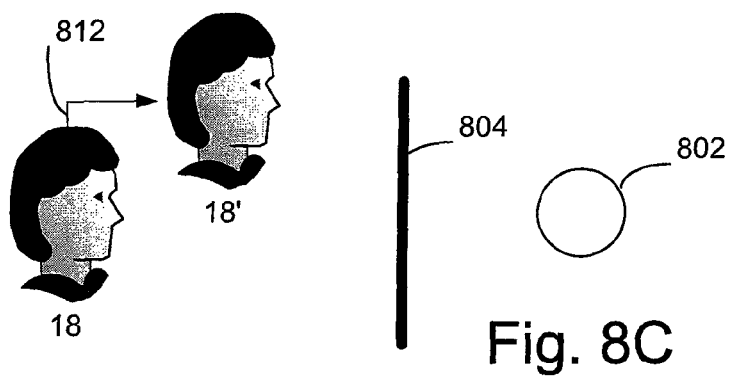
FIG. 8C illustrates a movement of the user's head in the user's physical space.

FIG. 8C illustrates a movement of the user's 18 head in the user's physical space. Here, user 18 moves both to his left and towards display device 812, from position 18 to position 18'. Display device 804 and the relative position of virtual object 802 remain constant.

Figure 8D:
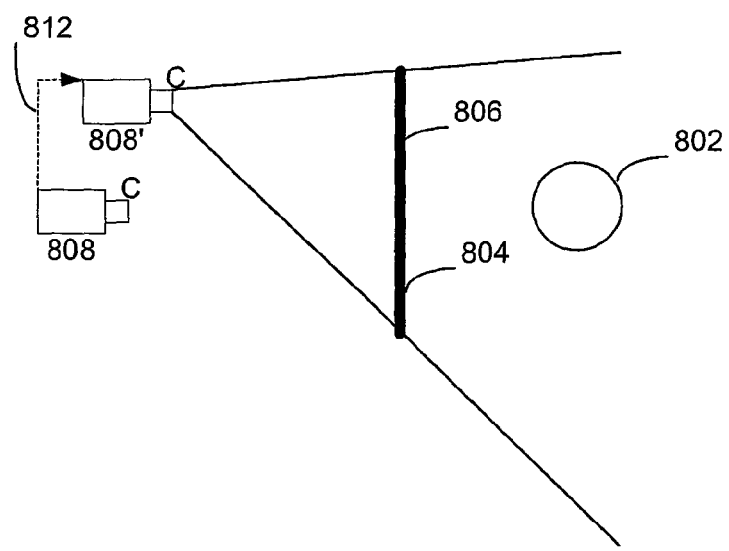
FIG. 8D illustrates a parallax view derived from user head tracking.

FIG. 8D illustrates a parallax view derived from user 18 head tracking. Camera's 808 location corresponds to the location of user 18 in FIG. 8C. As user 18 moves 812 to 18' in FIG. 8C, camera 808 correspondingly moves 812 to 808'. As user 18 does this, the view screen 806 remains static at the same spot as display device 804, so its position relative to virtual object 802 remains constant.

Figure 8E:
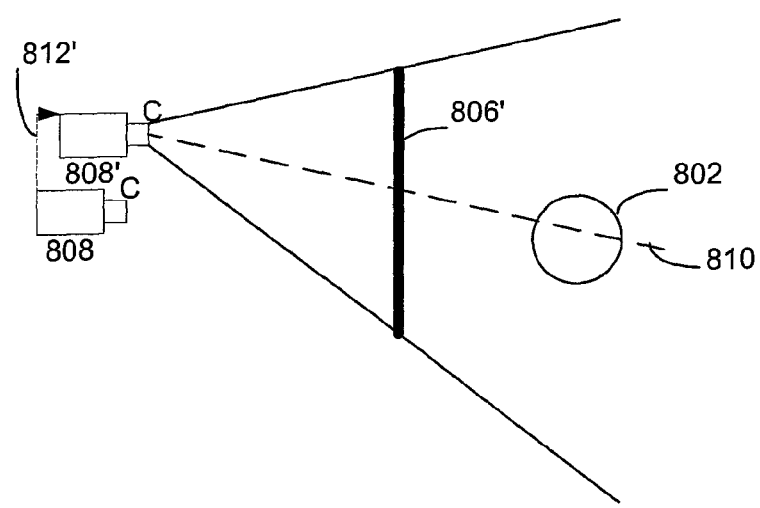
FIG. 8E illustrates the use of a dynamic view surface as used to view a rendered scene.

FIG. 8E illustrates the use of a dynamic view surface 806' as used to view a rendered scene. The view surface 806' is no longer static, and now moves with the render camera 808. An appropriate size of the view surface 806 and distance from the camera may be determined and the scene may be rendered as such. To achieve variation in field of view, a concept of a natural user position is used that declares an ideal distance that the user 18 is from the display device. The change from this distance is used to move the view screen closer or further away by a factor that allows the field of view to be manipulated in a controlled fashion. To ensure that a chosen point is maintained in view in the virtual environment, the idea of a focus point is used. The center of the view screen is placed on a line 810 between the camera position and the focus point. This means that the camera's view is always centered on this focus point.

The camera's movement may be further controlled by scaling its movement by a movement factor from its desired position based on the user's 18 distance from his natural user position in front of the camera.

In an embodiment, the application determines that virtual object 802 is an object of interest, and a perspective controlled by user 18 will be made relative to virtual object 802. For example, as user 18 moves to 18' in FIG. 8C, causing camera 808 to move 812' to 808' in FIG. 8E, the view screen 806' moves relative to the virtual object 802 such that virtual object 802 remains along or near the center line 810 of the view of camera 808'

CONCLUSION

While the present disclosure has been described in connection with the preferred aspects, as illustrated in the various figures, it is understood that other similar aspects may be used or modifications and additions may be made to the described aspects for performing the same function of the present disclosure without deviating therefrom. Therefore, the present disclosure should not be limited to any single aspect, but rather construed in breadth and scope in accordance with the appended claims. For example, the various procedures described herein may be implemented with hardware or software, or a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium. When the program code is loaded into and executed by a machine, such as a computer, the machine becomes an apparatus configured for practicing the disclosed embodiments. In addition to the specific implementations explicitly set forth herein, other aspects and implementations will be apparent from consideration of the specification disclosed herein. It is intended that the specification and illustrated implementations be considered as examples only.

What is claimed:

1. A method for changing a perspective displayed on a display device, comprising:
   receiving data captured by a capture device, the capture device capturing movement or position of at least part of a user or an object controlled by the user;
   analyzing the data to determine it is likely that the user performed a system-recognized gesture that is indicative of modifying a perspective of a camera view into a virtual scene displayed on the display device, the system-recognized gesture comprising the user moving his or her head relative to the display device; and
   displaying the modified perspective of the camera view into the virtual scene on the display device based on a position of the user's head relative to the display device, the modified perspective being determined by a viewing area formed by the planes from the user's eyes or head extending to a border of the display device, such that movement by the user results in a parallax view perspective.

2. The method of claim 1, wherein the perspective is at least one from a set, the set comprising:
   a change from a first preset to a second preset, a dolly, a crane, a zoom, a pan, a tilt, a truck, and a cant.

3. The method of claim 1, further comprising:
   receiving second data captured by a second capture device, the second capture device capturing at least part of a second user or an object controlled by the second user;
   analyzing the second data to determine it is likely that the second user performed a second system-recognized gesture, the second system-recognized gesture corresponding to a second perspective; and
   wherein displaying the perspective on the display device comprises: displaying a combination of the perspective and the second perspective on the display device.

4. The method of claim 3, wherein the perspective is displayed on a first portion of the display device, and the second perspective is displayed on a second portion of the display device.

5. The method of claim 3, wherein the system-recognized gesture corresponds to a physical location of the user, the second system-recognized gesture corresponds to a physical location of the second user, and a combination of the first perspective and the second perspective comprises:
   a perspective corresponding to an average physical location of the user and the second user.

6. The method of claim 3, wherein displaying a combination of the first perspective and the second perspective comprises:
   displaying the perspective overlaid on the second perspective or the second perspective overlaid on the perspective.

7. The method of claim 6, wherein each perspective is tinted with a unique color.

8. The method of claim 6, wherein one of the perspective and the second perspective comprises an infrared image one of the perspective and the second perspective comprises a color image.

9. The method of claim 1, wherein a perspective comprises a plurality of attributes, and the perspective comprises a first attribute of the plurality of attributes and the second perspective comprises a second attribute of the plurality of attributes.

10. A system for changing a perspective displayed on a display device, comprising:
    a processor; and
    a memory communicatively coupled to the processor when the system is operational, the memory bearing processor-executable instructions that, when executed on the processor, cause the system at least to:
      receive data captured by a capture device, the capture device capturing movement or position of at least part of a user or an object controlled by the user;
      analyze the data to determine it is likely that the user performed a system-recognized gesture that is indicative of modifying a perspective of a camera view into a virtual scene displayed on the display device, the system-recognized gesture comprising the user moving his or her head relative to the display device; and
      display the modified perspective of the camera view into the virtual scene on the display device based on a position of the user's head relative to the display device, wherein the modified perspective is determined by a viewing area formed by the planes from the user's eyes or head extending to a border of the display device, such that movement by the user results in a parallax view perspective.

11. The system of claim 10, wherein the display device displays a scene comprising an unaffected portion and an affected portion, and the instructions that, when executed on the processor cause the system to at least display the modified perspective of the camera view into the virtual scene on the display device further cause the system at least to:
    display the perspective on the affected portion of the scene of the display device.

12. The system of claim 10, wherein the instructions that, when executed on the processor cause the system to at least display the modified perspective of the camera view into the virtual scene on the display device further cause the system at least to:
    move the camera view into the virtual scene displayed on the display device in a direction corresponding to a vector of movement of the user, the vector of movement being coplanar with a plane of the display device.

13. The system of claim 10, wherein the gesture comprises a distance from the display device or the capture device, and the modified perspective comprises a magnification of a portion of the virtual scene.

14. The system of claim 13, wherein the magnification comprises magnification of text or magnification of the virtual scene on the display device.

15. The system of claim 10, wherein a virtual object in the viewing area is determined to be a focus point, and the parallax viewing perspective keeps the focus point in a noticeable position in the viewing area.

16. The system of claim 10, wherein the data corresponds to a position or movement of the head of the user, a position or movement of a hand of the user, a position or movement of a body part of the user, a position or movement of the user, a position or movement of a prop controlled by the user, a location of the user in a scene in which the user is being captured, or a location of the user relative to the capture device or the display device.

17. The system of claim 10, wherein the memory further bears instructions that, when executed on the processor, cause the system at least to:
receive second data captured by a second capture device, the second capture device capturing at least part of a second user or an object controlled by the second user;
analyze the second data to determine it is likely that the second user performed a second system-recognized gesture, the second system-recognized gesture corresponding to a second perspective; and
display a combination of the perspective and the second perspective on the display device.

18. The system of claim 17, wherein the system-recognized gesture corresponds to a physical location of the user, the second system-recognized gesture corresponds to a physical location of the second user, and a combination of the first perspective and the second perspective comprises:
a perspective corresponding to an average physical location of the user and the second user.

19. A computer-readable storage medium, comprising computer-readable instructions that when executed on a processor, cause the processor to perform the operations of:
receiving data captured by a capture device, the capture device capturing movement or position of at least part of a user or an object controlled by the user;
analyzing the data to determine it is likely that the user performed a system-recognized gesture, the system-recognized gesture corresponding to a perspective, the system-recognized gesture comprising the user moving his or her head relative to the display device; and
displaying the perspective on the display device based on a position of the user's head relative to the display device, the perspective being determined by a viewing area formed by the planes from the user's eyes or head extending to a border of the display device, such that movement by the user results in a parallax view perspective.

* * * * *